(12) United States Patent
Lasko

(10) Patent No.: US 7,785,673 B2
(45) Date of Patent: Aug. 31, 2010

(54) HOT MELT APPLICATION SYSTEM

(76) Inventor: Bernard Lasko, 1029 Woodburn Rd., Spartanburg, SC (US) 29302

( * ) Notice: Subject to any disclaimer, the term of this patent is extended or adjusted under 35 U.S.C. 154(b) by 265 days.

(21) Appl. No.: 12/030,266

(22) Filed: Feb. 13, 2008

(65) Prior Publication Data

US 2008/0190365 A1    Aug. 14, 2008

Related U.S. Application Data

(60) Provisional application No. 60/889,771, filed on Feb. 14, 2007.

(51) Int. Cl.
*H05B 6/02* (2006.01)
*B29C 35/08* (2006.01)

(52) U.S. Cl. ............ 427/591; 427/598; 427/422; 427/427.4; 222/146.2; 222/146.5; 118/623

(58) Field of Classification Search ............ 427/591, 427/598, 422, 427.4; 222/146.2, 146.5
See application file for complete search history.

(56) References Cited

U.S. PATENT DOCUMENTS 6,223,950 B1 * 5/2001 Lasko ............ 222/146.5

* cited by examiner

*Primary Examiner*—Michael Cleveland
*Assistant Examiner*—Lisha Jiang

(57) ABSTRACT

Hot melt adhesive pellets are melted and pressure pumped in a controlled application pattern on the substrate at the application site. The high frequency power supply, induction heated melting susceptor, pressure pump, and pattern control electronics are all contained in a single unit within adhesive projection distance.

5 Claims, 2 Drawing Sheets

HOT MELT APPLICATION SYSTEM

CROSS-REFERENCE TO RELATED APPLICATIONS

This application claims the benefits of provisional application Ser. No. 60/889771 filed Feb. 14, 2007, in the United States Patent & Trademark Office.

FIELD OF THE INVENTION

A method and apparatus for delivering melted material. The invention utilizes an induction-heated susceptor attached to a gerotor pump to melt and apply thermoplastic polymer materials.

BACKGROUND OF THE INVENTION

Hot melt adhesive materials are currently applied by melting pellets or slats in a resistance heated reservoir, pumping the hot liquid with a resistance heated pump through a resistance heated hose, to heated valves and nozzles at the application point. Each of these individual zone temperatures are monitored and controlled. The startup of the system requires a delay for the material in the reservoir to melt. Flow resistance of viscous materials in the heated delivery hoses requires high fluid pressures.

Maintaining a reservoir of hot material, pressure pumping for distant delivery, and maintaining heat in the delivery system elements are all wasted electrical energy. Thermoplastic materials retained at application temperature for long periods and overheating in the system forms char [crystallized particles] that need to be filtered before clogging application nozzles. Localized over temperature spots are a result of resistance element heating not being able to adequately expose the majority of the material to a heat conduction element that is not in excess of the target temperature. Extended melted material exposure to the atmosphere in the melt reservoir requires material additives to counter oxidation.

Hot delivery elements, particularly delivery hoses, are a costly replacement item. Material changes are difficult and time consuming. The melt tank needs to be cleaned, and the pump delivery hoses purged. Higher melting temperature materials [400° to 450° F.] are particularly difficult to apply in the system. The invention addresses all of these problems in a small unit applied to localized melt and apply on demand.

SUMMARY OF THE INVENTION

The invention utilizes the efficient localized energy distribution of induction heating to combine the melting and pressure pumping of thermoplastic polymers. In this embodiment of the invention, hot melt adhesive materials are presented in a reservoir, melted by exposure to an induction heated susceptor whose energy input is coordinated with an adjoining positive displacement pump's delivery. The material is radial directed to the application substrate through an orifice or orifices in the pump face. These elements are combined with the pump motor in a housing that is mounted and directed at the application position. The high frequency power supply is attached to this frame along with the receiver of a pellet vacuum feeder. 24V DC power and four control lines communicate with the unit from a central DC power supply and remote control that can attend several application units in a coordinated pattern application system. All of the functions of a tank melter with heated hose delivery can be performed with this invention as a melt on demand system weighing only 4 pounds and pattern placing 16 pounds pr hour of hot melt adhesive at 350' F. Combining the magnetically heated melt susceptor and the pressurizing gerotor pump elements with the delivery orifices provides a unique application method for the delivery of thermoplastic material.

DETAILED DESCRIPTION OF THE INVENTION

Figure 1:
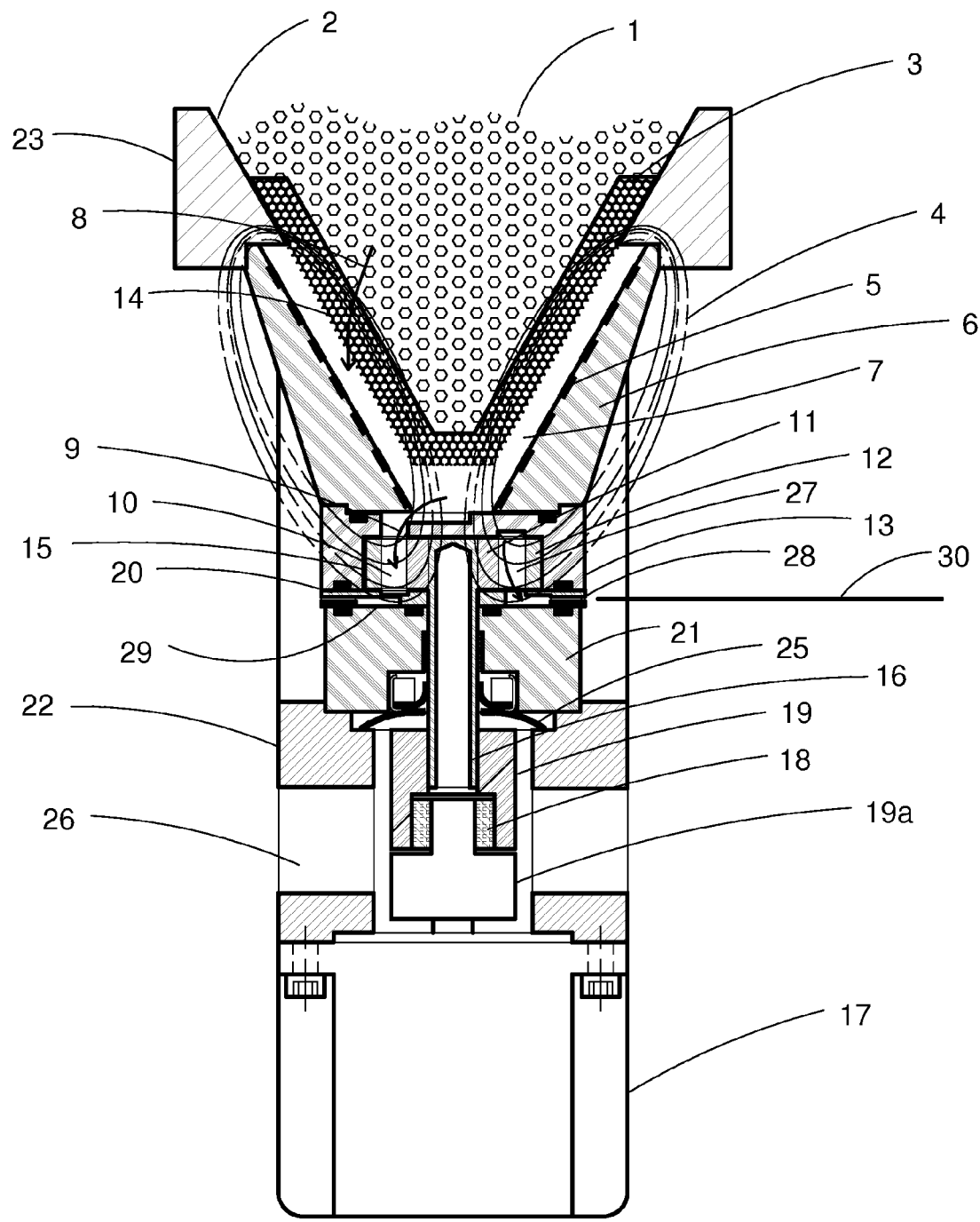
FIG. 1 is a sectional view of the apparatus of the invention.

FIG. 1 is a partial cross section of the apparatus of the invention. Thermoplastic polymer pellets 1 migrate by gravity flow to the apex of hopper 2 where they contact thermal susceptor 3. The susceptor is heated by the magnetic field 4 of inductor coil 5. The interactions of these elements are described in detail in Lasko U.S. Pat. No. 5,584,419.

Inductor coil 5 is cast in a ridged high temperature epoxy form 6 with its elongated surface exposed and spaced to transmit a uniform heat in susceptor 3. This susceptor is formed in the shape of a cone from metal foam or perforated metal sheet with a defined open space to maximum surface area ratio. Pellets 1 in contact with the susceptor receive heat by conduction from the susceptor and migrate through the spaces in the susceptor as they liquefy and exit into annulus 7 between susceptor 3 and inductor coil 5. Material transit depicted by arrow 8 requires only approximately two seconds of residency time in susceptor 5 to attain an application temperature.

Liquid material flow depicted by arrow 9 is drawn into the gerotor pump suction cavity 10 that is formed by the lobed central rotor 11 and the matching exterior rotating element 12. The high frequency power to inductor coil 5 is electronically matched to the variable displacement of the pump. This assures that the pump will have a continuous supply of liquid material and that the susceptor will melt material only on delivery demand. The gerotor pump elements 11 and 12 are encased in a ceramic housing 13. The assembly of the moving gerotor elements and the static ceramic housing is positioned to intercept the magnetic field 4. The mass of the susceptor 3 and gerotor elements 11 and 12 are designed to be proportionately conjoined in the magnetic field 4 to obtain the target operating temperature together from a cold start in a few seconds, wherein the magnetic field 4 simultaneously heats the susceptor 3 and gerator pump elements 11 and 12. Thermocouple signals from locations 14 at the susceptor and 15 at the gerotor are compared and the high frequency power to the inductor coil 5 is modulated to maintain the target temperature during operation.

The pump drive shaft 16 is thermally isolated from the drive motor 17 by the non-conductive compliance element 18 in the spider alignment coupling components 19 and 19a. The axis aligned assembly of the inductor coil housing 6, gerotor housing 13, pump face housing and orifice plate 20, and thermal insulator 21, are compressed in the assembly by the connection of frame 23 and armature 22. Spring washer 25 imparts a defined pressure to the assembly stack. Frame 23 is made of a polymer composite material that will not intercept and distort the magnetic field 4. Frame 23 is open on two opposing sides for assembly and operation. Passages 26 in armature 22 allow air-cooling and assembly access for coupling 19.

The gerotor pump pressure cavity 27 delivers the liquid material to multiple peripheral projection orifices 28 through a short passage 29 in the gerotor pump face housing and orifice plate 20. The delivery pattern of the exiting material 30 is controlled by the diameter of projection orifice 28 and the duration of the rotation of the gerotor pump. The volume of delivered material is defined by the displacement of the included material in the gerotor pump from suction cavity 10 to pressure cavity 27. The equivalent volume is specified by the angular rotation of pump drive shaft 16. Immediately reversing the pump rotation a few degrees at the end of each pattern delivery cycle draws back material in the projection orifices 28 and breaks the projected stream of exiting material 30 to the substrate. High temperature "0" rings and shaft seals are utilized throughout the assembly to confine the exit of hot material to only the projection orifices 28.

Figure 2:
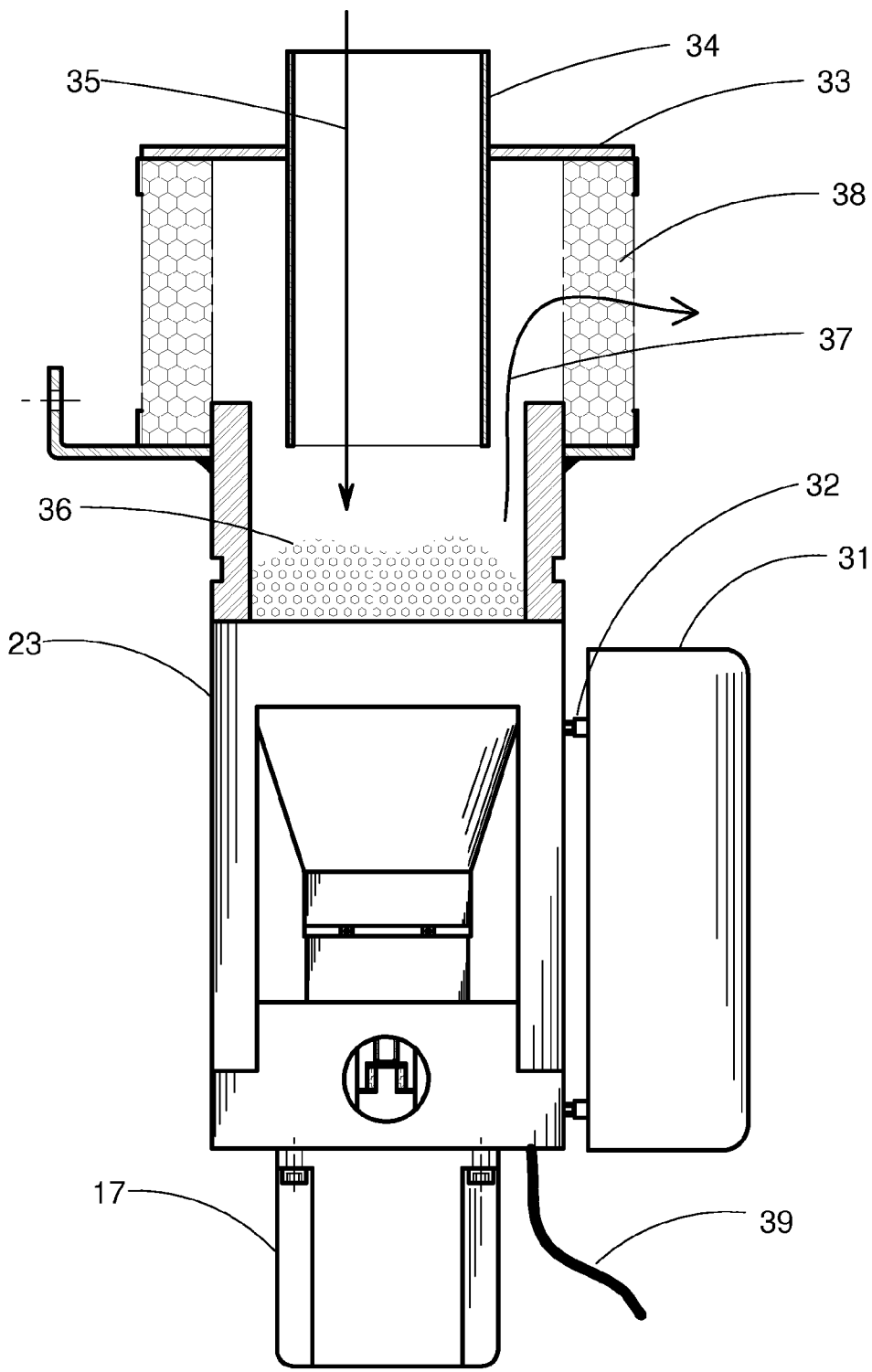
FIG. 2 is a view including the attachment of the HF power supply and pellet receiver.

FIG. 2 illustrates a 1 KW 100 KHz power supply 31 attached to frame 23 by a set of seven power and control connection pins 32. Air cooled high frequency power supply 31 is enclosed in a 5"×1.7×1.7 aluminum housing that is color coded for exchange to provide a specific material application temperature. A pellet vacuum feed system receiver 33 is shown in cross section attached to frame 23. Pellets from a vacuum feeder enter at delivery hose connection 34 and as shown by arrow 35 settle to a controlled level 36 as required by the application rate. The pellet feed air as represented by arrow 37 is exhausted through cylindrical filter 38. Power and control cable 39 provides DC current for high frequency power supply 31 and motor 17. Control lines for signaling pump rotation motor 17 and a vacuum feed pellet level sensor are also included in this cable. The addition of these two items, high frequency power supply 31 and pellet receiver 33 complete an application system to continuously apply hot melt adhesives.

I claim:

1. A method for melting and delivering thermoplastic material including the steps of:
    melting material that contacts the surface of and passes through a magnetically heated susceptor;
    pressurizing the melted material in an adjacent pump, having pump elements that are simultaneously heated by the same magnetic field; and
    delivering the melted material to a target substrate by projection through a pump housing included orifice.

2. A method according to claim 1 where the pump rotor is reversed slightly at the end of each pump rotating cycle to draw back material in the projection orifice to break the projecting stream.

3. A method according to claim 1 that delivers a defined pattern of melted material to a targeted substrate by controlling the duration of the rotation of the pump elements.

4. A method according to claim 1 that controls the quantity of projected material by signaling the pump's motor controller to rotate an angle that will displace an equivalent volume.

5. A method according to claim 1 that supplies multiple orifices directed at the target substrate.

* * * * *